(12) United States Patent
Zhang et al.

(10) Patent No.: US 11,132,518 B2
(45) Date of Patent: Sep. 28, 2021

(54) METHOD AND APPARATUS FOR TRANSLATING SPEECH

(71) Applicant: Beijing Baidu Netcom Science And Technology Co., LTD., Beijing (CN)

(72) Inventors: Chuanqiang Zhang, Beijing (CN); Tianchi Bi, Beijing (CN); Hao Xiong, Beijing (CN); Zhi Li, Beijing (CN); Zhongjun He, Beijing (CN); Haifeng Wang, Beijing (CN)

(73) Assignee: Beijing Baidu Netcom Science and Technology Co., Ltd.

( * ) Notice: Subject to any disclaimer, the term of this patent is extended or adjusted under 35 U.S.C. 154(b) by 146 days.

(21) Appl. No.: 16/691,111

(22) Filed: Nov. 21, 2019

(65) Prior Publication Data

US 2020/0192986 A1 Jun. 18, 2020

(30) Foreign Application Priority Data

Dec. 17, 2018 (CN) .......................... 201811542586.9

(51) Int. Cl.
| | |
|---|---|
| *G06F 40/58* | (2020.01) |
| *G06N 3/04* | (2006.01) |
| *G06N 3/08* | (2006.01) |
| *G10L 15/06* | (2013.01) |
| *G10L 15/16* | (2006.01) |
| *G10L 15/22* | (2006.01) |
| *G10L 15/30* | (2013.01) |

(52) U.S. Cl.
CPC .............. *G06F 40/58* (2020.01); *G06N 3/04* (2013.01); *G06N 3/08* (2013.01); *G10L 15/063* (2013.01); *G10L 15/16* (2013.01); *G10L 15/22* (2013.01); *G10L 15/30* (2013.01)

(58) Field of Classification Search
CPC ....... G10L 15/063; G10L 15/16; G10L 15/22; G10L 15/30; G06F 40/58; G06N 3/04; G06N 3/08
See application file for complete search history.

(56) References Cited

U.S. PATENT DOCUMENTS

2008/0319736 A1* 12/2008 Toutanova .............. G06F 40/44
704/9
2009/0024613 A1* 1/2009 Niu ...................... G06F 16/3338
(Continued)

*Primary Examiner* — Michael Colucci
(74) *Attorney, Agent, or Firm* — Weaver Austin Villeneuve & Sampson LLP (57) ABSTRACT

A method and apparatus for translating speech are provided. The method may include: recognizing received to-be-recognized speech of a source language to obtain a recognized text; concatenating the obtained recognized text after a to-be-translated text, to form a concatenated to-be-translated text; inputting the concatenated to-be-translated text into a pre-trained discriminant model to obtain a discrimination result for characterizing whether the concatenated to-be-translated text is to be translated, where the discriminant model is used to characterize a corresponding relationship between a text and a discrimination result corresponding to the text; in response to the positive discrimination result being obtained, translating the concatenated to-be-translated text to obtain a translation result of a target language, and outputting the translation result.

16 Claims, 5 Drawing Sheets

(56) References Cited

U.S. PATENT DOCUMENTS

| | | | | |
|---|---|---|---|---|
| 2009/0192798 A1* | 7/2009 | Basson | ............ | G06F 40/58 |
| | | | | 704/270 |
| 2011/0144974 A1* | 6/2011 | Seo | ............ | G06F 40/47 |
| | | | | 704/4 |
| 2011/0208521 A1* | 8/2011 | McClain | ............ | G10L 17/26 |
| | | | | 704/233 |
| 2013/0006954 A1* | 1/2013 | Nikoulina | ............ | G06F 40/44 |
| | | | | 707/706 |
| 2014/0156258 A1* | 6/2014 | Suzuki | ............ | G06F 40/47 |
| | | | | 704/3 |
| 2015/0370780 A1* | 12/2015 | Wang | ............ | G06F 40/274 |
| | | | | 704/9 |
| 2017/0076199 A1* | 3/2017 | Zhang | ............ | G06N 3/02 |
| 2017/0293611 A1* | 10/2017 | Tu | ............ | G06F 16/9535 |
| 2017/0330363 A1* | 11/2017 | Song | ............ | G06T 13/80 |
| 2018/0285352 A1* | 10/2018 | Ma | ............ | G06F 40/42 |
| 2018/0329883 A1* | 11/2018 | Leidner | ............ | G06F 16/2237 |
| 2019/0266246 A1* | 8/2019 | Wang | ............ | G06F 40/58 |
| 2020/0167930 A1* | 5/2020 | Wang | ............ | G06T 7/0012 |

* cited by examiner

METHOD AND APPARATUS FOR TRANSLATING SPEECH

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present application relate to the field of computer technologies, and in particular, to a method and apparatus for translating speech.

BACKGROUND

Automatic simultaneous interpretation, also known as "real-time speech translation", refers to a process of acquiring user's speech of a language in real time, and then automatically recognizing and translating the acquired speech into a translation result of other language. This process replaces the manual simultaneous interpretation. Generally, in order to achieve better effects, the requirement on delay is high. High delay of the automatic simultaneous interpretation will affect the simultaneous interpretation effect, and affect the audience/listener's listening and understanding effects.

SUMMARY

Embodiments of the present application provide a method and apparatus for translating speech.

In a first aspect, some embodiments of the present application provide a method for translating speech, including: recognizing received to-be-recognized speech of a source language to obtain a recognized text; concatenating the obtained recognized text after a to-be-translated text, to form a concatenated to-be-translated text; inputting the concatenated to-be-translated text into a pre-trained discriminant model to obtain a discrimination result for characterizing whether the concatenated to-be-translated text is to be translated, where the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately; in response to the positive discrimination result being obtained, translating the concatenated to-be-translated text to obtain a translation result of a target language, and outputting the translation result.

In some embodiments, before outputting the translation result, the method further includes: clearing concatenated the to-be-translated text.

In some embodiments, the method further includes: in response to the negative discrimination result being obtained, using the concatenated to-be-translated text as the to-be-translated text and performing recognition on a next to-be-recognized speech in real time.

In some embodiments, the discriminant model is pre-trained through: determining a network structure of an initial neural network and initializing network parameters of the initial neural network; acquiring a training sample set, where a training sample includes a sample text and corresponding annotation information, the annotation information is used to characterize whether the sample text is fit for being translated separately; training the initial neural network using a machine learning method, by taking a sample text and annotation information in the training sample of the training sample set as an input and a desired output of the initial neural network respectively; and determining the trained initial neural network as a pre-trained discriminant model.

In some embodiments, the initial neural network includes an input layer, a hidden layer, a fully connected layer, and a classifier layer.

In a second aspect, some embodiments of the present application provide an apparatus for translating speech, including: at least one processor; and a memory storing instructions, the instructions when executed by the at least one processor, cause the at least one processor to perform operations, the operations comprising: recognizing received to-be-recognized speech of a source language to obtain a recognized text; concatenating the obtained recognized text after a to-be-translated text, to form a concatenated to-be-translated text; inputting the concatenated to-be-translated text into a pre-trained discriminant model to obtain a discrimination result for characterizing whether the concatenated to-be-translated text is to be translated, where the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately; and translating, in response to the positive discrimination result being obtained, the concatenated to-be-translated text to obtain a translation result of a target language, and outputting the translation result.

In some embodiments, the operations further comprise: clearing the concatenated to-be-translated text before outputting the translation result.

In some embodiments, the operations further comprises in response to the negative discrimination result being obtained, using the concatenated to-be-translated text as the to-be-translated text and performing recognition on a next to-be-recognized speech in real time.

In some embodiments, the discriminant model is pre-trained through: determining a network structure of an initial neural network and initializing network parameters of the initial neural network; acquiring a training sample set, where a training sample includes a sample text and corresponding annotation information, the annotation information is used to characterize whether the sample text is fit for being translated separately; training the initial neural network using a machine learning method, by taking a sample text and annotation information in the training sample of the training sample set as an input and a desired output of the initial neural network respectively; and determining the trained initial neural network as a pre-trained discriminant model.

In some embodiments, the initial neural network includes an input layer, a hidden layer, a fully connected layer, and a classifier layer.

In a third aspect, some embodiments of the present application provide an electronic device, including: one or more processors; and a storage apparatus, configured to store one or more programs, where when the one or more programs are executed by the one or more processors, the one or more processors implement the method described in any implementation manner of the first aspect.

In a fourth aspect, some embodiments of the present application provide a non-transitory computer readable storage medium on which computer programs are stored, where when the computer programs are executed by one or more processors, the method described in any implementation manner of the first aspect is implemented.

Currently, in the real-time speech translation, the frequency that the speech recognition portion gives out full stops is very low. If the recognized text obtained by speech recognition is translated in units of sentences completed with full stops, the time between two adjacent translations is long, so that the delay of real-time speech translation is long, and the effect of real-time speech translation is poor. According to the method and apparatus for translating speech provided by some embodiments of the present application, the received to-be-recognized speech of a source language is recognized to obtain a recognized text, the obtained recognized text is concatenated after a to-be-translated text, then the concatenated to-be-translated text is input into a pre-trained discriminant model to obtain a discrimination result for characterizing whether the to-be-translated text is to be translated, finally, in response to the positive discrimination result being obtained, the to-be-translated text is translated to obtain a translation result of a target language, and the translation result is output. That is, before a full stop appears in the recognized text obtained by the speech recognition, whether translation could be performed is discriminated by the discriminant model, and the translation the translation could be started without the appearance of a full stop, the appearance of a full stop is not necessarily needed for the starting of the translation, so that the time interval between two translations is reduced, that is, the translation delay is reduced, and the effect of real-time speech translation is improved.

BRIEF DESCRIPTION OF THE DRAWINGS

After reading detailed descriptions of non-restrictive embodiments with reference to the following accompanying drawings, other features, objectives and advantages of the present application will become more apparent.

DETAILED DESCRIPTION OF EMBODIMENTS

Embodiments of the present disclosure will be further described below in detail in combination with the accompanying drawings. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that some embodiments in the present disclosure and some features in the disclosure may be combined with each other on a non-conflict basis. Features of the present disclosure will be described below in detail with reference to the accompanying drawings and in combination with the embodiments.

Figure 1:
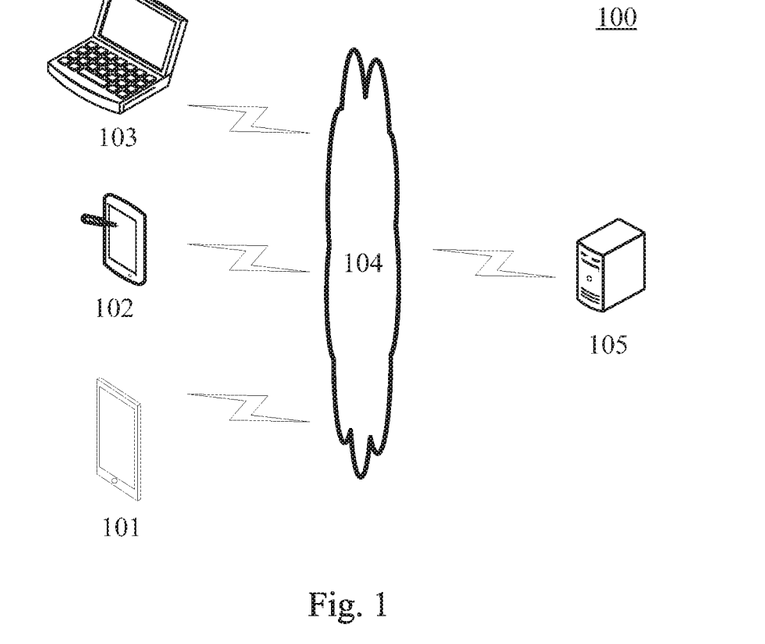
FIG. 1 is an illustrative system architecture diagram to which some embodiments of the present application can be applied.

FIG. 1 shows an illustrative system architecture 100 that can be applied to the embodiments of a method for translating speech or an apparatus for translating speech according to the present application.

As shown in FIG. 1, the system architecture 100 may include terminal devices 101, 102 and 103, a network 104, and a server 105. The network 104 is configured to provide a medium of a communication link between the terminal devices 101, 102 and 103 and the server 105. The network 104 may include various connection types, such as wired or wireless communication links or optical fiber cables.

A user may interact with the server 105 by using the terminal device 101, 102 or 103 through the network 104 to receive or send messages, etc. The terminal devices 101, 102 and 103 may be installed with various communication client applications, such as speech acquisition applications, web browser applications, shopping applications, search applications, instant messaging tools, e-mail clients, and social platform software.

The terminal devices 101, 102 and 103 may be hardware or software. When the terminal devices 101, 102 and 103 are hardware, they may be various electronic devices having an audio acquisition function, including but not limited to a smart phone, a tablet computer, a laptop computer, a desktop computer, etc. When the terminal devices 101, 102 and 103 are software, they may be installed in the listed electronic devices. The terminal devices may be implemented as multiple software or software modules (e.g., to provide audio acquisition services) or as single software or software module. Specific limitations are not provided here.

The server 105 may be a server that provides various services, such as a background server that recognizes source language-based speech received from the terminal device 101, 102 or 103 and translates the same to give a translation result.

It should be noted that the method for translating speech, provided by embodiments of the present application, is generally executed by the server 105, and accordingly, the apparatus for translating speech is generally set in the server 105.

It should be noted that the server 105 may be hardware or software. When the server 105 is hardware, it may be implemented as a distributed server cluster composed of multiple servers, or implemented as a single server. When the server is software, it may be implemented as multiple software or software modules (e.g., to provide real-time speech translation services), or implemented as a single software or software module. Specific limitations are not provided here.

It should be appreciated that the numbers of the terminal devices, the network and the server in FIG. 1 are only schematic. Any number of terminal devices, networks and servers are available as needed.

Figure 2:
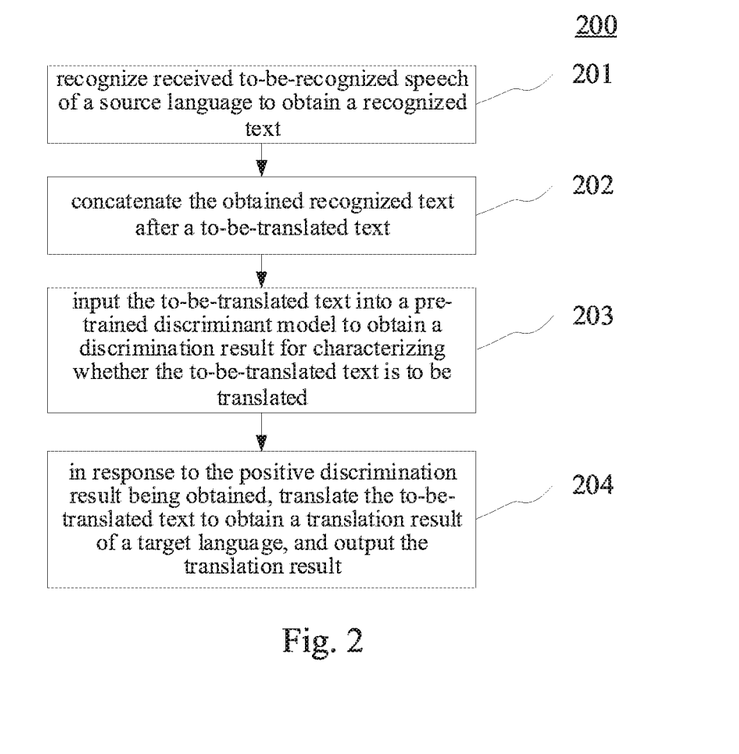
FIG. 2 is a flowchart of a method for translating speech according to an embodiment of the present application.

Further referring to FIG. 2, it shows a process 200 of a method for translating speech according to an embodiment of the present application. The method for translating speech comprises the following steps:

Step 201, the received to-be-recognized speech of a source language is recognized to obtain a recognized text.

In this embodiment, an executive body (e.g., the server shown in FIG. 1) of the method for translating speech may recognize the received to-be-recognized speech of a source language to obtain a recognized text.

Here, the source language may be one of the various languages, which is not specifically limited in the present application.

In some optional implementation manners of this embodiment, the to-be-recognized speech may be sent to the executive body in a wired or wireless connection manner by a terminal device in network connection with the executive body. For example, in a simultaneous interpretation scenario, the terminal device may collect speech in the environment in real time and cache the collected speech, and send the cached speech to the executive body after detecting that speech is not collected during a time interval exceeding a preset time length. For another example, in a simultaneous interpretation scenario, the terminal device may also collect the speech in the environment in real time, and send the collected speech as to-be-recognized speech to the executive body every preset time length. For another example, the terminal device may also send a speech file locally stored to the executive body as to-be-recognized speech.

In some optional implementation manners of this embodiment, the to-be-recognized speech may also be locally cached or stored by the executive body. For example, in a simultaneous interpretation scenario, the executive body itself collects speech in the environment in real time and caches the collected speech, and determines the cached speech as to-be-recognized speech after detecting that speech is not collected during a time interval exceeding a preset time length. For another example, in a simultaneous interpretation scenario, the executive body may collect the speech in the environment in real time, and determine the collected speech as to-be-recognized speech every preset time length. For another example, the executive body may also determine a speech file locally stored as to-be-recognized speech.

It should be noted that the above various methods for recognizing the to-be-recognized speech to obtain a recognized text are well-known technologies widely studied and applied at present, and details will be omitted herein.

Step 202, the obtained recognized text is concatenated after a to-be-translated text.

In this embodiment, the executive body may concatenate the recognized text obtained by the speech recognition in step 201 after a to-be-translated text. Here, the to-be-translated text is a recognized text obtained by speech recognition, accumulated before the current time and not yet translated. Of course, if in step 201, the speech is initially started to be translated, then the to-be-translated text has not yet been accumulated, and the to-be-translated text may be empty.

Step 203, the to-be-translated text is input into a pre-trained discriminant model to obtain a discrimination result for characterizing whether the to-be-translated text is to be translated.

In this embodiment, after concatenating the recognized text obtained by the speech recognition after the to-be-translated text in step 202, the executive body may input the concatenated to-be-translated text into a pre-trained discriminant model to obtain a discrimination result for characterizing whether the to-be-translated text is to be translated. Here, the discriminant model is used to characterize a corresponding relationship between a text and a discrimination result corresponding to the text, and the discrimination result corresponding to the text may be a positive discrimination result for indicating the text being to be translated separately or a negative discrimination result for indicating the text being not to be translated separately. For example, "1" and "0" may be used to represent the positive discrimination result and the negative discrimination result respectively. For another example, "True" and "False" may also be used to represent the positive discrimination result and the negative discrimination result respectively.

As an example, the discriminant model may include a feature extraction portion and a corresponding relationship table. The feature extraction portion may be used to extract a feature from the text to generate a feature vector. For example, the feature extraction portion may first segment the text into a word sequence, then convert each word in the word sequence into a word vector (e.g., using a word bag model or a word-embedding model) to obtain a word vector sequence, and input the word vector sequence into various neural networks for processing time series data to obtain a feature vector corresponding to the text. Here, the neural networks for processing time series data may include, but are not limited to, a Convolutional Neural Network (CNN), a Recurrent Neural Network (RNN), a Gate Neural Network (GNN), a Long Short Term Memory (LSTM), a Bidirectional Recurrent Neural Network (BiRNN), etc. The corresponding relationship table may be created in advance by a technician based on statistics on a large amount of feature vectors and discrimination results, and the corresponding relationship table stores corresponding relationships between multiple feature vectors and discrimination results. In this way, the discriminant model may first extract a feature of the to-be-translated text obtained in step 202 by using the feature extraction portion, to generate a text feature vector. Then, the text feature vector is successively compared with the multiple feature vectors in the corresponding relationship table. If one feature vector in the corresponding relationship table is identical or similar to the text feature vector, the discrimination result corresponding to the feature vector in the corresponding relationship table is used as a discrimination result corresponding to the concatenated to-be-translated text in step 202.

Figure 3:
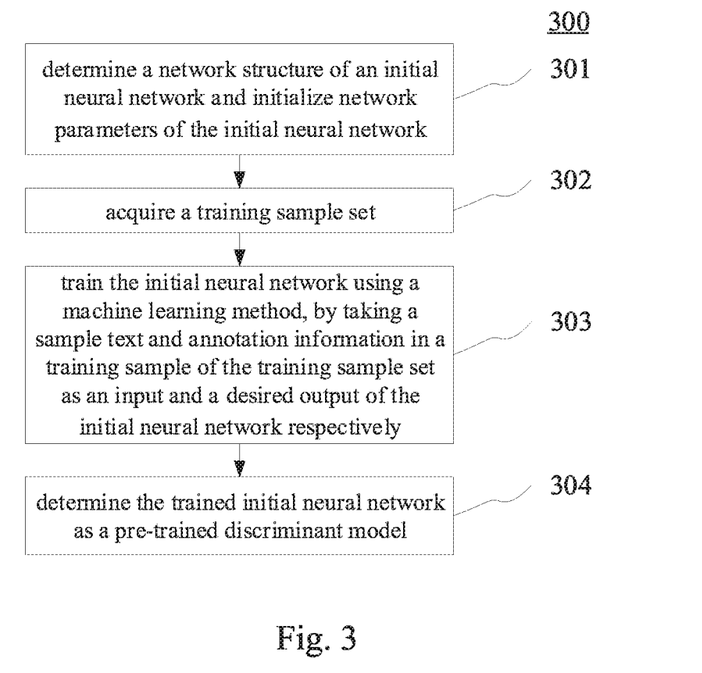
FIG. 3 is a flowchart of the translating steps according to an embodiment of the present application.

In some optional implementation manners of this embodiment, the discriminant model may be pre-trained through the training steps shown in FIG. 3. As shown in FIG. 3, the training steps may include steps 301 to 304 below:

Step 301, a network structure of an initial neural network is determined and network parameters of the initial neural network are initialized.

In this embodiment, the executive body of the training steps may be the same as or different from the executive body of the method for translating speech. If same, the executive body of the training steps may locally store, after training to obtain a neural network, network structure information of the trained neural network and parameter values of network parameters. If different, the executive body of the training steps may send, after training to obtain a neural network, network structure information of the trained neural network and parameter values of network parameters to the executive body of the method for translating speech.

Here, the executive body of the training steps may first determine a network structure of an initial neural network. For example, the executive body may determine what layers an initial neural network include, a connecting sequence relation of the layers, what neurons each layer includes, weights and biases corresponding to the respective neurons, activation functions for the respective layers, etc.

It may be appreciated that the neural network can be one of various types of neural networks, the network structure to be determined for different types of neural networks is also different.

Optionally, the initial neural network may be various neural networks suitable for processing time series data, and may include, but is not limited to, a CNN, a RNN, a GNN, an LSTM, a BiRNN, etc.

Then, the executive body of the training step may initialize network parameters of the initial neural network. In practice, various network parameters (e.g., weight parameter and bias parameter) of the neural network may be initialized with some different small random numbers. The "small random numbers" are used to ensure that the network does not enter saturation state due to oversized weight, the saturation leads to training failure. The "different" is used to ensure that the network can learn normally.

Step 302, a training sample set is acquired.

Here, the executive body of the training steps may acquire a training sample set locally or remotely from other electronic device in network connection with the executive body. Each training sample may include a sample text and corresponding annotation information, and the annotation information is used to characterize whether the sample text is fit for being translated separately. For example, the annotation information corresponding to the sample text may be manually annotated.

As an example, the annotation information may be a numerical value. For example, 0 represents that the sample text is not fit for being translated separately, and 1 represents that the sample text is fit for being translated separately. For another example, the annotation information may also be a combination of texts, characters or symbols. For example, a character string "fit" represents that the sample text is fit for being translated separately, and a character string "unfit" represents that the sample text is not fit for being translated separately.

As an example, a rule for manually annotating information on a sample text is given here.

Two clauses str1 and clause str2 are given. If the translation result of a clause: str1+","+str2 begins from the translation result of str1+",", and the translation result of str1+","+str2 is composed of the translation result of the str, the translation result of str1+"," and the translation result of str2, the clause str1 may be annotated as fit for separate translation.

Step 303, the initial neural network is trained using a machine learning method, by taking a sample text and annotation information in a training sample of the training sample set as an input and a desired output of the initial neural network respectively.

Here, the executive body of the training steps may first segment a text in a training sample in the training sample set into a word sequence, then convert each word in the word sequence into a word vector (e.g., using a word bag model or a word-embedding model) to obtain a word vector sequence, input the word vector sequence into the initial neural network to obtain a discriminant result of the sample text, and train the initial neural network using a machine learning method by taking the annotation information in the training sample as a desired output of the initial neural network. Specifically, the difference between the obtained discrimination result and the annotation information in the training sample may be first calculated using a preset loss function, for example, an L2 norm, a cross entropy loss or the like may be used as a loss function to calculate the difference between the obtained discrimination result and the annotation information in the training sample. Then, network parameters of the initial neural network may be adjusted based on the calculated difference, and the training ends if a preset training end condition is satisfied. For example, the preset training end condition here may include, but is not limited to, at least one of the following: the training time exceeds a preset time length; the training times exceed a preset number; and the calculated difference is smaller than a preset difference threshold.

Here, various implementations may be used to adjust the network parameters of the initial neural network based on the calculated difference between the discrimination result and the annotation information in the training sample. For example, a BP (Back Propagation) algorithm or an SGD (Stochastic Gradient Descent) algorithm is used to adjust the network parameters of the initial neural network.

Step 304, the trained initial neural network is determined as a pre-trained discriminant model.

Here, the executive body of the training steps may determine the initial neural network trained in step 303 as a pre-trained discriminant model.

Alternatively, the initial neural network may include an input layer, a hidden layer, a fully connected layer, and a classifier layer. The input layer is used to input the word vector sequence, the hidden layer is used to connect front and back layers, the fully connected layer is used to implement feature dimension reduction, and the classifier layer is used to perform nonlinear calculation on the data output from the fully connected layer, thereby obtaining a probability value between 0 and 1 for characterizing that the sample text is fit for being translated separately. For example, the classifier layer may perform nonlinear calculations using a Softmax function.

A discriminant model may be obtained through steps 301 to 304.

Step 204, in response to the obtained positive discrimination result being obtained, the to-be-translated text is translated to obtain a translation result of a target language, and the translation result is output.

In this embodiment, in response to the determination result obtained in step 203 being a positive discrimination result, it indicates that the to-be-translated text is fit for being translated, and the executive body does not need to wait for a new recognized text, but translates the to-be-translated text to obtain a translation result of a target language, and then outputs the translation result.

Here, the target language may be a language different from the source language.

It should be noted that the above various methods for translating the to-be-translated text to obtain a translation result of a target language are well-known technologies widely studied and applied at present, and details are not described herein again.

Here, various methods may be used to output the translation result. For example, in a simultaneous interpretation scenario, the translation result may be presented in the form of a text or a picture on a display connected to the executive body. Of course, speech synthesis may be performed on the translation result, and the synthesized speech may be played by a speaker. Of course, the translation result may also be stored.

In some optional implementation manners of this embodiment, before the translation result is output, because the to-be-translated text has been translated, the executive body may clear the to-be-translated text. Then, when step 202 is performed next time, the to-be-translated text does not have translatable content.

Figure 4:
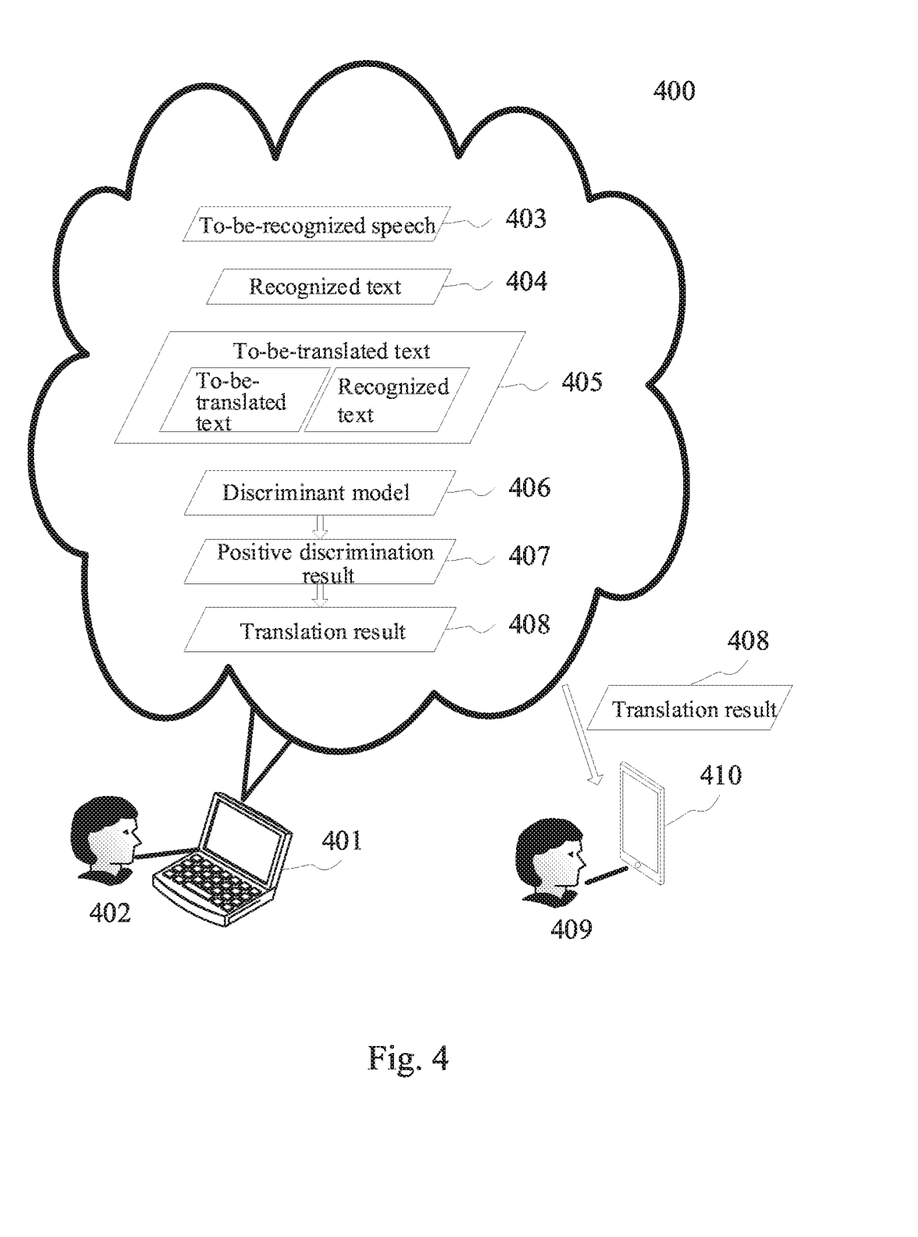
FIG. 4 is a flowchart of an application scenario of the method for translating speech according to the present application.

Further refer to FIG. 4, which is a schematic diagram of an application scenario of the method for translating speech according to this embodiment. In the application scenario of FIG. 4, a terminal device 401 collects in real time user speech spoken by a user 402 in a source language—English, and recognizes the collected user speech as to-be-recognized speech 403 to obtain a recognized text 404; Then a server 401 concatenates the obtained recognized text 404 after a to-be-translated text 405; next, the server 401 inputs the to-be-translated text 405 into a pre-trained discrimination model 406 to obtain a discrimination result 407; and the to-be-translated text 405 is translated to obtain a translation result 408 of a target language-Chinese, and the obtained translation result 408 is output to a terminal device 410 of a user 409.

According to the method provided by the above embodiments of the present application, the received to-be-recognized speech of a source language is recognized to obtain a recognized text, the obtained recognized text is concatenated after a to-be-translated text, then the to-be-translated text is input into a pre-trained discriminant model to obtain a discrimination result for characterizing whether the to-be-translated text is to be translated, and finally, in response to the obtained positive discrimination result being obtained, the to-be-translated text is translated to obtain a translation result of a target language, and the translation result is output. That is, before a full stop appears in the recognized text obtained by the speech recognition, whether translation could be performed is discriminated by the discriminant model, and the translation could be started without the appearance of a full stop, the appearance of a full stop is not necessarily needed for the starting of the translation, so that the time interval between two translations is reduced, that is, the translation delay is reduced, and the effect of real-time speech translation is improved.

Figure 5:
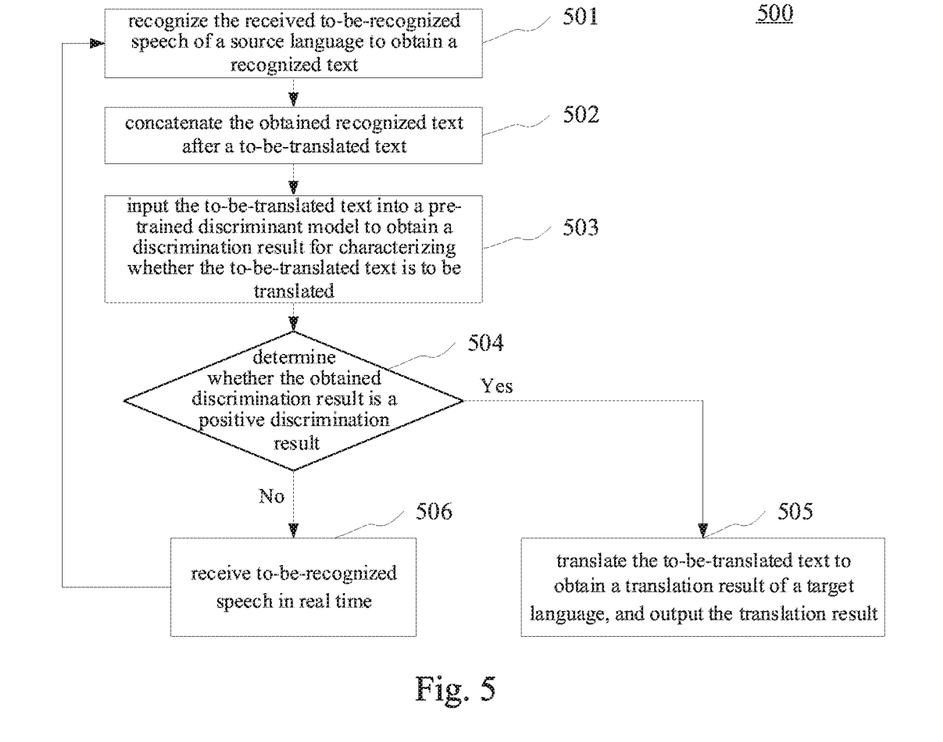
FIG. 5 is a flowchart of the method for translating speech according to another embodiment of the present application.

Further refer to FIG. 5, which shows a process 500 of another embodiment of the method for translating speech. The process 500 of the method for translating speech includes the following steps:

Step 501, the received to-be-recognized speech of a source language is recognized to obtain a recognized text.

Step 502, the obtained recognized text is concatenated after a to-be-translated text.

Step 503, the to-be-translated text is input into a pre-trained discriminant model to obtain a discrimination result for characterizing whether the to-be-translated text is to be translated.

In this embodiment, the specific operations of steps 501, 502 and 503 are substantially same as the operations of steps 201, 202 and 203 in the embodiment shown in FIG. 2, and details are not described herein again.

Step 504, whether the obtained discrimination result is a positive discrimination result is determined.

In this embodiment, the executive body of the method for translating speech (e.g., the server shown in FIG. 1) may determine whether the discrimination result obtained in step 503 is a positive discrimination result. If it is a positive discrimination result, step 505 is executed, and if it is a negative discrimination result, step 506 is executed.

Step 505, the to-be-translated text is translated to obtain a translation result of a target language, and the translation result is output.

In this embodiment, if the determination result obtained in step 504 is determined to be a positive discrimination result, it indicates that the to-be-translated text is fit for being translated separately, and the executive body may translate the to-be-translated text to obtain a translation result of a target language, and output the translation result.

Step 506, to-be-recognized speech is received in real time.

In this embodiment, if the determination result obtained in step 504 is determined to be a negative discrimination result, it indicates that the to-be-translated text is not fit for being translated separately, the executive body may receive to-be-recognized speech in real time, and step 501 is executed again. That is, more to-be-recognized speech is received, the recognized text corresponding to the to-be-recognized speech is continuously concatenated after the to-be-translated text, and whether the concatenated to-be-translated text is fit for being translated separately is determined again.

It can be seen from FIG. 5 that, compared with the embodiment corresponding to FIG. 2, the process 500 of the method for translating speech in this embodiment includes one more step of continuing to receive to-be-recognized speech when the to-be-translated text is determined to be not fit for being translated separately. Thus, the solution described in this embodiment can translate speech more comprehensively, that is, reduce the translation delay in simultaneous interpretation.

Figure 6:
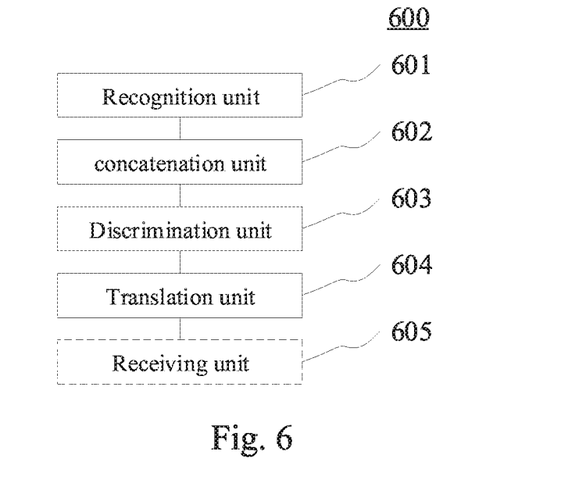
FIG. 6 is a schematic structural diagram of an apparatus for translating speech according to an embodiment of the present application.

Further referring to FIG. 6, as an implementation of the method shown in the above figures, the present application provides an embodiment of an apparatus for translating speech, the embodiment of the apparatus corresponds to the embodiment of the method shown in FIG. 2, and the apparatus specifically can be applied to various electronic devices.

As shown in FIG. 6, the apparatus 600 for translating speech in this embodiment includes: a recognition unit 601, a concatenation unit 602, a discrimination unit 603, and a translation unit 604. The recognition unit 601 is configured to recognize received to-be-recognized speech of a source language to obtain a recognized text; the concatenation unit 602 is configured to concatenated the obtained recognized text after a to-be-translated text; the discrimination unit 603 is configured to input the to-be-translated text into a pre-trained discriminant model to obtain a discrimination result for characterizing whether the to-be-translated text is to be translated, where the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately; and the translation unit 604 is configured to translate, in response to the positive discrimination result being obtained, the to-be-translated text to obtain a translation result of a target language, and output the translation result.

In this embodiment, for specific processing of the recognition unit 601, the concatenation unit 602, the discrimination unit 603 and the translation unit 604 in the apparatus 600 for translating speech and the technical effects achieved by the processing, reference may be made to related descriptions of steps 201, 202, 203 and 204 in the corresponding embodiment of FIG. 2, and details are not described herein again.

In some optional implementation manners of this embodiment, the translation unit 604 may be further configured to: clear the to-be-translated text before outputting the translation result.

In some optional implementation manners of this embodiment, the apparatus 600 may further include: a receiving unit 605, configured to receive to-be-recognized speech in real time in response to the negative discrimination result being obtained.

In some optional implementation manners of this embodiment, the discriminant model may be pre-trained through: determining a network structure of an initial neural network and initializing network parameters of the initial neural network; acquiring a training sample set, where a training sample includes a sample text and corresponding annotation information, the annotation information is used to characterize whether the sample text is fit for being translated separately; training the initial neural network using a machine learning method, by taking a sample text and annotation information in the training sample of the training sample set as an input and a desired output of the initial neural network respectively; and determining the trained initial neural network as a pre-trained discriminant model.

In some optional implementation manners of this embodiment, the initial neural network may include an input layer, a hidden layer, a fully connected layer, and a classifier layer.

It should be noted that, for the implementation details and technical effects of the units in the apparatus for translating speech provided by the embodiment of the present application, reference may be made to the descriptions of other embodiments in the present application, and details are not described herein again.

Hereinafter, referring to FIG. 7, it shows a schematic structural diagram of a computer system 700 of an electronic device suitable for implementing the embodiments of the present application. The electronic device shown in FIG. 7 is just an example, which does not impose any restrictions on the functionality and scope of application of the embodiments of the present application.

Figure 7:
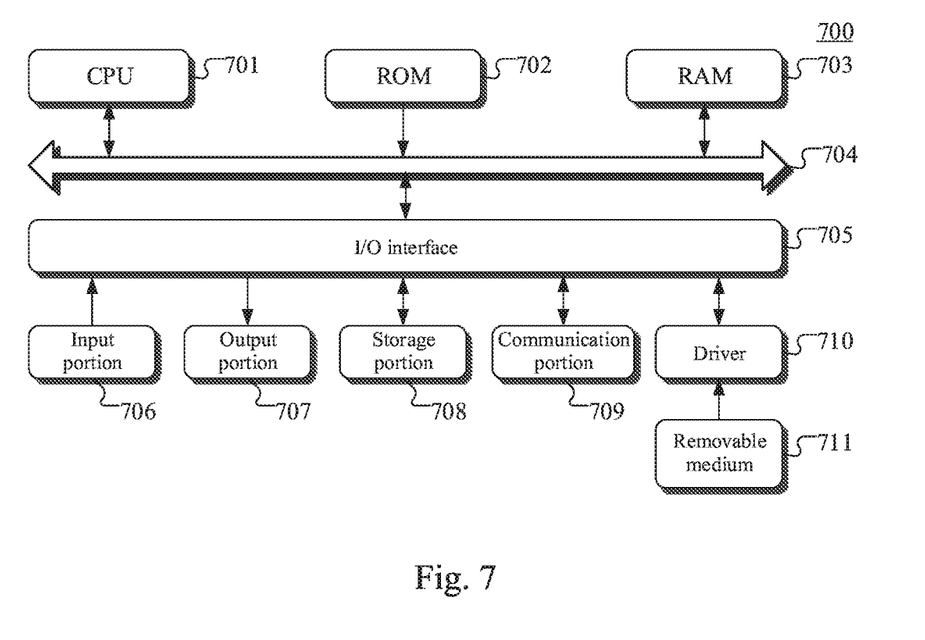
FIG. 7 is a schematic structural diagram of a computer system of an electronic device suitable for implementing the embodiments of the present application.

As shown in FIG. 7, the computer system 700 includes a Central Processing Unit (CPU) 701, which can execute various appropriate operations and processes based on programs stored in a Read Only Memory (ROM) 702 or programs loaded from a storage portion 708 to a Random Access Memory (RAM) 703. Various programs and data required by the operations of the system 700 are also stored in the RAM 703. The CPU 701, the ROM 702, and the RAM 703 are connected to each other by a bus 704. An Input/Output (I/O) interface 705 is also connected to the bus 704.

The following parts are connected to the I/O interface 705: an input portion 706 including a keyboard, a mouse, etc.; an output portion 707 including a Cathode Ray Tube (CRT), a Liquid Crystal Display (LCD), a speaker, etc.; a storage portion 708 including a hard disk, etc.; and a communication portion 709 including a network interface card such as an LAN (Local Area Network) card and a modem. The communication portion 709 executes communication processing through a network such as Internet. A driver 710 is also connected to the I/O interface 705 as needed. A removable medium 711 such as a magnetic disk, an optical disk, a magneto-optical disk or a semiconductor memory is installed on the driver 710 as needed, so that a computer program read therefrom is installed in the storage portion 708 as needed.

Especially, according to some embodiments of the present disclosure, a process described above by referring to the flow diagrams can be implemented as a computer software program. For example, an embodiment of the present application provides a computer program product including a computer program loaded to a computer readable medium, the computer program including a program code for executing the method shown in the flowchart. In such an embodiment, the computer program may be downloaded and installed from a network by the communication portion 709, and/or installed from the removable medium 711. When the computer program is executed by the CPU 701, the functions defined in the method of the present application are executed. It should be noted that the computer readable medium of the present application may be a computer readable signal medium or a computer readable storage medium or a combination of the two. For example, the computer readable storage medium may be, but is not limited to, an electric, magnetic, optical, electromagnetic, infrared or semiconductor system, apparatus or device, or a combination of them. The computer readable storage medium, for more specific examples, may include but not limited to: an electrical connection with one or more leads, a portable computer disk, a hard disk, a random access memory (RAM), a read-only memory (ROM), an erasable programmable read-only memory (EPROM or flash), an optical fiber, a portable compact disk read-only memory (CD-ROM), an optical storage device, a magnetic storage device, or any appropriate combination of them. In the present application, the computer readable storage medium may be any physical medium including or storing a program, and the program may be used by an instruction execution system, apparatus or device or used by a combination of them. However, in the present application, a computer readable signal medium can include data signals propagating in a baseband or as a part of a carrier, and carry computer readable program codes. The data signals propagated may be in multiple forms, including but not limited to electromagnetic signals, optical signals or any appropriate combination of them. The computer readable signal medium may also be any computer readable medium beyond the computer readable storage medium, and the computer readable medium can be sent, propagated or transmitted to a program used by an instruction execution system, apparatus or device or used by a combination of them. The program codes included in the computer readable medium may be transmitted by any appropriate medium, including but not limited to wireless, wired, optical cable, RF, etc., or any appropriate combination of them.

The process diagrams and block diagrams in the drawings illustrate system architectures, functions and operations that may be implemented according to the systems, methods and computer program products of various embodiments of the present application. In this regard, each box in the flowcharts or block diagrams may represent a module, a program segment, or a part of a code, which includes one or more executable instructions for implementing the specified logical functions. It should be noted that, in some alternative implementations, the functions marked in the boxes may also be implemented in an order different from that marked in the drawing. For example, two consecutive boxes substantially may be executed in parallel, or sometimes executed in a reverse order, depending on the involved functions. It should also be noted that, each box in the block diagrams and/or flowcharts, and a combination of boxes in the block diagrams and/or flowcharts may be implemented by a dedicated hardware-based system for executing specified functions or operations, or implemented by a combination of dedicated hardware and computer instructions.

The units described in the embodiments of the present application may be implemented by software or hardware. The units described may also be set in a processor, for example, it may be described as a processor includes a recognition unit, a splicing unit, a discrimination unit, and a translation unit. The names of these units do not limit the units themselves under certain circumstances, for example, the recognition unit may also be described as "a unit configured to recognize received to-be-recognized speech of a source language to obtain a recognized text".

As another aspect, the present application further provides a computer readable medium, which may be included in the apparatus described in the above embodiment, or exists alone and is not assembled into the apparatus. The computer readable medium carries one or more programs, and when the one or more programs are executed by the apparatus, the apparatus is caused to: recognize received to-be-recognized speech of a source language to obtain a recognized text; concatenate the obtained recognized text after a to-be-translated text; input the to-be-translated text into a pre-trained discriminant model to obtain a discrimination result for characterizing whether the to-be-translated text is to be translated, where the discriminant model is used to characterize a corresponding relationship between a text and a discrimination result corresponding to the text, and the discrimination result corresponding to the text may be a positive discrimination result for indicating the text being to be translated separately or a negative discrimination result for indicating the text being not to be translated separately; in response to the positive discrimination result being obtained, translate the to-be-translated text to obtain a translation result of a target language, and output the translation result.

What described above are only preferred embodiments of the present application and descriptions of the applied technical principles. It should be appreciated by those skilled in the art that the scope of the present application is not limited to the technical solution formed by a specific combination of the above technical features, and at the same time, it also should cover other technical solutions formed by any combinations of the above technical features or equivalent features thereof without departing from the inventive concept, for example, technical solutions formed by mutual replacement between the above features and the technical features with similar functions disclosed by (but not limited to) the present application.

What is claimed is:

1. A method for translating speech, comprising:
   recognizing received to-be-recognized speech of a source language to obtain a recognized text;
   concatenating the obtained recognized text after a to-be-translated text, to form a concatenated to-be-translated text;
   inputting the concatenated to-be-translated text into a pre-trained discriminant model to obtain a discrimination result for characterizing whether the concatenated to-be-translated text is to be translated, wherein the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately;
   in response to the positive discrimination result being obtained, translating the concatenated to-be-translated text to obtain a translation result of a target language, and outputting the translation result.

2. The method according to claim 1, wherein before outputting the translation result, the method further comprises:
   clearing the concatenated to-be-translated text.

3. The method according to claim 1, further comprising:
   in response to the negative discrimination result being obtained, using the concatenated to-be-translated text as the to-be-translated text and performing recognition on a next to-be-recognized speech in real time.

4. The method according to claim 1, wherein the discriminant model is pre-trained through:
   determining a network structure of an initial neural network and initializing network parameters of the initial neural network;
   acquiring a training sample set, wherein a training sample comprises a sample text and corresponding annotation information, the annotation information is used to characterize whether the sample text is fit for being translated separately;
   training the initial neural network using a machine learning method, by taking a sample text and annotation information in the training sample of the training sample set as an input and a desired output of the initial neural network respectively; and
   determining the trained initial neural network as a pre-trained discriminant model.

5. The method according to claim 4, wherein the initial neural network comprises an input layer, a hidden layer, a fully connected layer, and a classifier layer.

6. An apparatus for translating speech, comprising:
   at least one processor; and
   a memory storing instructions, the instructions when executed by the at least one processor, cause the at least one processor to perform operations, the operations comprising:
   recognizing received to-be-recognized speech of a source language to obtain a recognized text;
   concatenating the obtained recognized text after a to-be-translated text, to form a concatenated to-be-translated text;
   inputting the concatenated to-be-translated text into a pre-trained discriminant model to obtain a discrimination result for characterizing whether the concatenated to-be-translated text is to be translated, wherein the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately; and
   translating, in response to the positive discrimination result being obtained, the concatenated to-be-translated text to obtain a translation result of a target language, and outputting the translation result.

7. The apparatus according to claim 6, wherein the operations further comprise:
   clearing the concatenated to-be-translated text before outputting the translation result.

8. The apparatus according to claim 6, wherein the operations further comprise:
   in response to the negative discrimination result being obtained, using the concatenated to-be-translated text as the to-be-translated text and performing recognition on a next to-be-recognized speech in real time.

9. The apparatus according to claim 6, wherein the discriminant model is pre-trained through:
   determining a network structure of an initial neural network and initializing network parameters of the initial neural network;

acquiring a training sample set, wherein a training sample comprises a sample text and corresponding annotation information, the annotation information is used to characterize whether the sample text is fit for being translated separately;

training the initial neural network using a machine learning method, by taking a sample text and annotation information in the training sample of the training sample set as an input and a desired output of the initial neural network respectively; and determining the trained initial neural network as a pre-trained discriminant model.

10. The apparatus according to claim 9, wherein the initial neural network comprises an input layer, a hidden layer, a fully connected layer, and a classifier layer.

11. A non-transitory computer readable storage medium storing a computer program, wherein the computer program, when executed by a processor, causes the processor to perform operations, the operations comprising:

recognizing received to-be-recognized speech of a source language to obtain a recognized text;

concatenating the obtained recognized text after a to-be-translated text, to form a concatenated to-be-translated text;

inputting the concatenated to-be-translated text into a pre-trained discriminant model to obtain a discrimination result for characterizing whether the concatenated to-be-translated text is to be translated, wherein the discriminant model is used to characterize a corresponding relationship between a text and a discrimination result corresponding to the text, and the discrimination result corresponding to the text is a positive discrimination result for indicating the text being to be translated separately or a negative discrimination result for indicating the text being not to be translated separately;

in response to the positive discrimination result being obtained, translating the concatenated to-be-translated text to obtain a translation result of a target language, and outputting the translation result.

12. The medium according to claim 11, wherein before outputting the translation result, the operations further comprise:

clearing the concatenated to-be-translated text.

13. The medium according to claim 11, wherein the operations further comprise:

in response to the negative discrimination result being obtained, using the concatenated to-be-translated text as the to-be-translated text and performing recognition on a next to-be-recognized speech in real time.

14. The medium according to claim 11, wherein the discriminant model is pre-trained through:

determining a network structure of an initial neural network and initializing network parameters of the initial neural network;

acquiring a training sample set, wherein a training sample comprises a sample text and corresponding annotation information, the annotation information is used to characterize whether the sample text is fit for being translated separately;

training the initial neural network using a machine learning method, by taking a sample text and annotation information in the training sample of the training sample set as an input and a desired output of the initial neural network respectively; and determining the trained initial neural network as a pre-trained discriminant model.

15. The Medium according to claim 14, wherein the initial neural network comprises an input layer, a hidden layer, a fully connected layer, and a classifier layer.

16. The method according to claim 2, wherein after clearing the concatenated to-be-translated text, setting the to-be-translated text to be empty and performing recognition on a next to-be-recognized speech in real time.

* * * * *